No. 783,932. PATENTED FEB. 28, 1905.
R. W. DEAN.
FENCE GATE.
APPLICATION FILED JUNE 16, 1904.
2 SHEETS—SHEET 1.
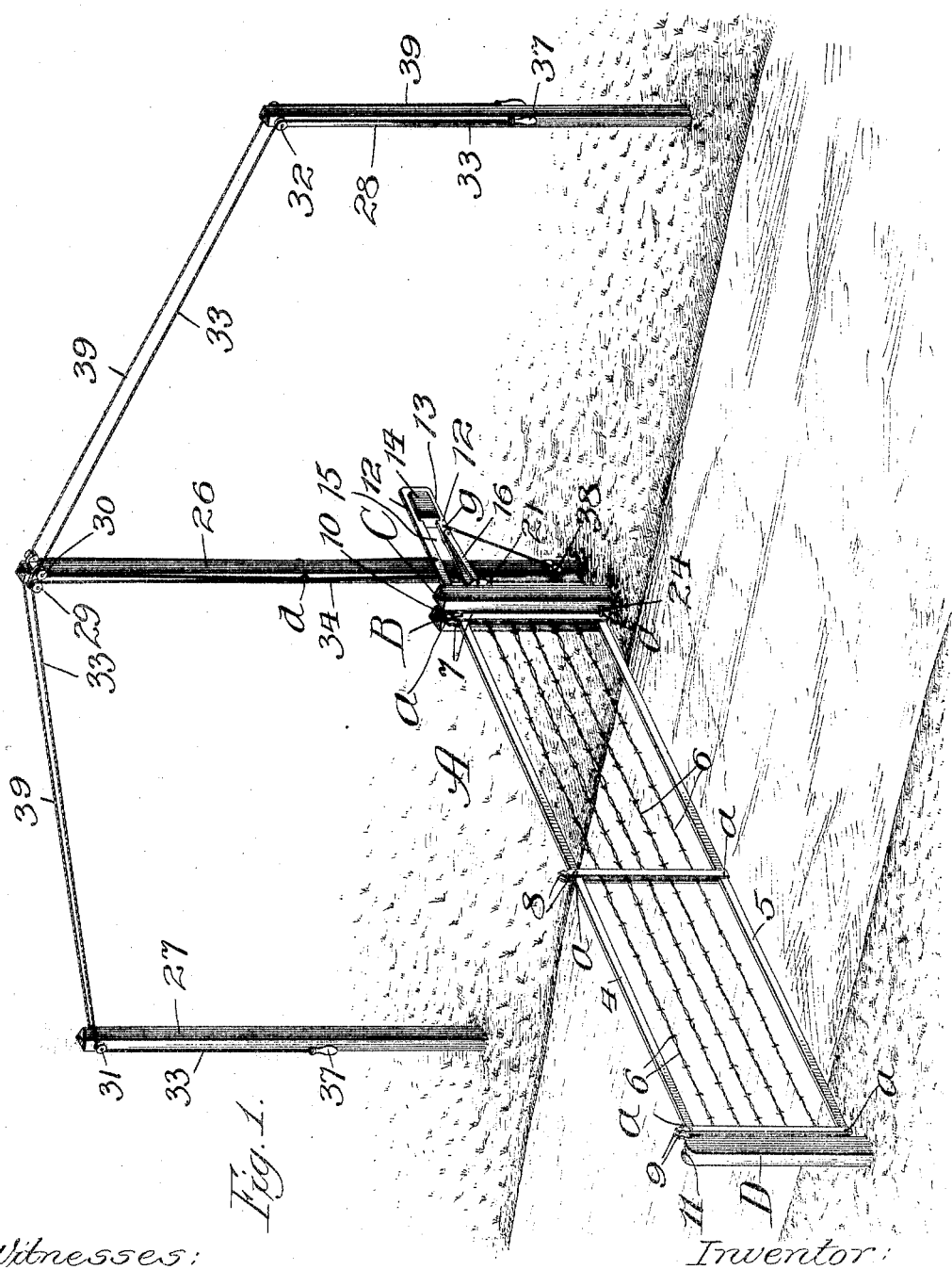
Witnesses:
Inventor:
Robert W. Dean,
By L. B. Coupland
Att'y No. 783,932. PATENTED FEB. 28, 1905.
R. W. DEAN.
FENCE GATE.
APPLICATION FILED JUNE 16, 1904.
2 SHEETS—SHEET 2.
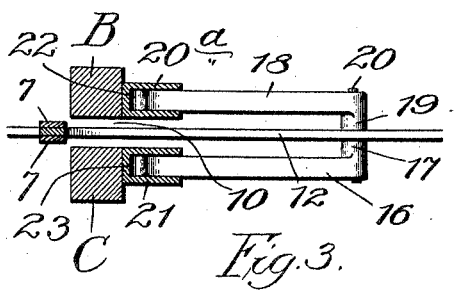
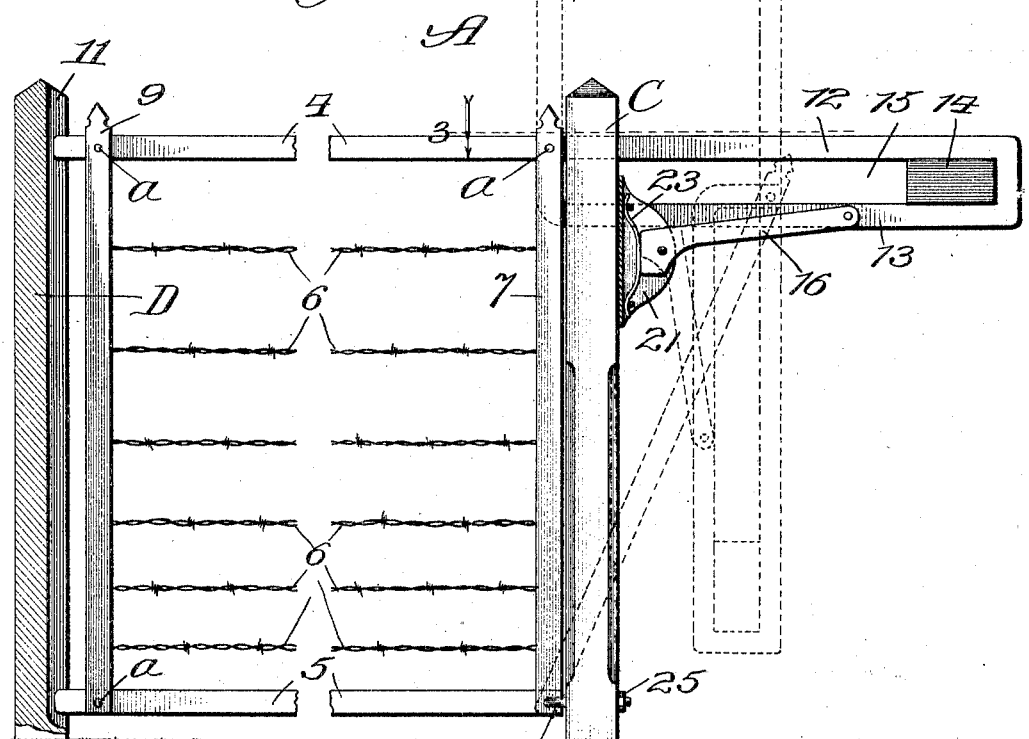

No. 783,932.  
Patented February 28, 1905.

UNITED STATES PATENT OFFICE.

ROBERT W. DEAN, OF CHICAGO, ILLINOIS.

FENCE-GATE.

SPECIFICATION forming part of Letters Patent No. 783,932, dated February 28, 1905.

Application filed June 16, 1904. Serial No. 212,813.

*To all whom it may concern:*

Be it known that I, ROBERT W. DEAN, a citizen of the United States, residing at Chicago, in the county of Cook and State of Illinois, have invented new and useful Improvements in Fence-Gates, of which the following is a specification.

This invention relates to improvements in the class of fence or farm gates in which the same may be opened or closed from a vehicle without the necessity of the operator's getting out, and has for its object to provide a light, simple, and durable structure of this character, as will be hereinafter set forth.

In the drawings, Figure 1 is a view in perspective embodying the improved features, showing the gate in its closed position. Fig. 2 is an elevation showing the gate in its closed position, the open vertical position being indicated by dotted lines. Fig. 3 is a horizontal section and plan on line 3, Fig. 2.

A represents the gate in its entirety, which comprises the top bar 4, the bottom bar 5, a number of parallel wires 6, disposed at intervals between the horizontal companion bars, and the upright bars 7, 8, and 9, all of which are secured together in the relative position shown. The gate is supported at the rear end by the companion posts B and C, separated by an intervening space 10, as best shown in Fig. 3. The front end of the gate shuts into the post D, which is provided with a groove 11, which prevents a lateral movement thereof. The upright bars are pivoted to the top and bottom bars, as at $a$, so as to assume the inclined position and conform to the change in folding the gate in its raised open position, which reduces the width of the gate to approximately one-half of its full size, as indicated in Fig. 2.

The upper framing-bar 4 is formed with the rear bifurcated beam extension 12, which lies in the space 10 between the rear gate-posts. The two parts of the beam 12 lie in the same vertical plane, the inner end of the lower part 13 curving upward, as indicated by dotted lines, and are secured to the upper bar by the same pivot that connects the upright bar 7 therewith, so as to readily conform to the swinging movement. A counterpoise-weight 14 is inserted in the space 15 between the two parts of the beam extension and serves the usual purpose of balancing the gate, so that but little power is required in opening and closing the same.

The outer end of a lever-arm 16 is provided with a hub 17 and a companion arm 18 with a hub 19. The adjacent hub ends come to a bearing on opposite sides of the lower part 13 of the beam extension 12 and are retained in proper working relation thereto by a pivot-pin 20. The inner ends of the companion lever-arms are pivoted, as at $b$, to companion brackets 21ª and 21, rigidly secured to the companion posts B and C. The respective inner ends of the lever-arms 16 and 18 have a moving contact with the companion half-elliptic springs 22 and 23, secured to the inside base of the brackets 21ª and 21, as best shown in Fig. 3. The ends of the levers in contact with the convex sides of the springs are square, Fig. 2, so that the pressure of the springs will be exerted both above and below the center in accordance with the direction in which the gate is moving, as will be explained farther along.

The lower rear corner of the gate is pivotally mounted on the cross-bar of a U-shaped clevis 24, the respective threaded ends of which are inserted through the gate-posts B and C and locked in place by nuts 25. This provides for a free pivotal movement of the gate and mainly supports the weight of the same from this point.

The means employed for starting the opening and closing movement of the gate will next be described.

A post 26 is set some distance outside of the gate-posts B and C. The companion posts 27 and 28 are set at the proper distance apart from post 26 and on opposite sides of the gate and located at one side of the roadway, as clearly shown in Fig. 1. Two guide-sheaves 29 and 30 are mounted on the upper end of post 26. A sheave 31 is mounted on post 27 and a sheave 32 on post 28, which are in line with the sheaves on post 26. One branch of a manipulating-rope 33 connects with the end of a single rope 34, as at *d*, and from that point runs upward over sheave 29, then to and over sheave 31 and downward on post 27, and terminating in the handle end 35 at a proper height to be reached by the driver from a vehicle. Another branch rope 36 runs upward from the junction *d*, over sheave 30 and outward over sheave 32, and downward on post 28, terminating in handle end 37 within convenient reach. The single connecting-rope 34 runs downward from the junction *d* to and under a sheave 38, mounted on post 26 near the lower end, and then upward at an angle, and is secured to the lower part of the upper bar of the gate, as at *g*. This provides a means by which the gate may be opened from either side of the approach. In raising the gate to its open position it is sufficient to give the rope one short pull, just enough to overcome the position of rest of the counterpoise, when the pressure of springs 22 and 23 will complete the movement. The inner ends of the companion lever-arms normally bear against the highest part of the springs, Fig. 2, and after the gate is fairly started on the opening movement the outer ends of the levers move downward, which brings the lower corners and under side of the inner ends in position to receive the pressure of the springs in an upward direction in automatically completing the opening movement. The operation of the springs on the closing-down movement is the same after the gate has been first given the necessary start. A second rope 39 is properly connected with the gate and provides means for initiating the closing movement. This arrangement provides a combined counterweight and spring-balanced gate, as when the gate is closed a short pull on rope 33 will start the same on its opening movement, the operation being gradually and automatically completed by the action of springs 22 and 23. The operation of closing the gate through the medium of rope 39 is the same.

Having thus described my invention, what I claim is—

1. In a gate the combination with the upper horizontal bar provided with a rear beam extension, of a counterweight mounted on the beam extension, the posts between which the rear end of the gate is pivotally supported, the companion springs secured to said posts, the lever-arms having their outer ends pivoted to said beam extension and the inner ends contacting said springs, and means for initiating the opening-and-closing movement of the gate which is automatically completed by the action of the springs, substantially as set forth.

2. A gate provided with a beam extension carrying a counterweight, the posts to which the lower rear corner is pivoted, the springs mounted on said posts, the lever-arms having a pivotal connection between the springs and beam extension, and a rope connection for manually initiating the opening-and-closing movement of the gate, which movement is automatically completed by the action of the said springs and lever-arms, substantially as set forth.

3. In a gate, the combination with an upper horizontal bar provided with a rear beam extension, of a counterweight mounted thereon, a lower horizontal bar, the vertically-disposed framing-bars, the companion posts between which the rear end of the gate is pivotally mounted, the springs secured to said posts, the lever-arms pivotally connecting said beam extension and springs, and a rope connection for starting the gate on its opening-and-closing movement, substantially as set forth.

In testimony whereof I have signed my name to this specification in the presence of two subscribing witnesses.

ROBERT W. DEAN.

Witnesses:
L. B. COUPLAND,
J. B. DONALDSON.